US008640983B2

(12) United States Patent
Brunken, Jr.

(10) Patent No.: US 8,640,983 B2
(45) Date of Patent: Feb. 4, 2014

(54) ROTOR HUB AND CONTROLS FOR MULTI-BLADED ROTOR SYSTEM

(75) Inventor: John E. Brunken, Jr., Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 90 days.

(21) Appl. No.: 13/266,729

(22) PCT Filed: May 21, 2009

(86) PCT No.: PCT/US2009/044886
§ 371 (c)(1),
(2), (4) Date: Oct. 27, 2011

(87) PCT Pub. No.: WO2010/134920
PCT Pub. Date: Nov. 25, 2010

(65) Prior Publication Data
US 2012/0043412 A1  Feb. 23, 2012

(51) Int. Cl.
*B64C 27/22* (2006.01)

(52) U.S. Cl.
USPC .............................. 244/6; 244/17.23; 416/114

(58) Field of Classification Search
USPC ...................... 244/6; 416/113, 114
See application file for complete search history.

(56) References Cited

U.S. PATENT DOCUMENTS

| 2,481,750 | A | * | 9/1949 | Hiller, Jr. et al. | 416/115 |
| 3,002,711 | A | * | 10/1961 | Stefano | 244/17.23 |
| 3,035,789 | A | * | 5/1962 | Young | 244/7 C |
| 3,784,319 | A | * | 1/1974 | Amer et al. | 416/135 |
| 4,881,874 | A | * | 11/1989 | White et al. | 416/138 |
| 5,066,195 | A | * | 11/1991 | Dobrzynski | 416/200 R |
| 5,096,383 | A | * | 3/1992 | Dobrzynski | 416/200 R |
| 5,381,985 | A | * | 1/1995 | Wechsler et al. | 244/7 C |
| 6,616,095 | B2 | * | 9/2003 | Stamps et al. | 244/17.13 |
| 6,695,106 | B2 | * | 2/2004 | Smith et al. | 188/378 |
| 7,264,199 | B2 | * | 9/2007 | Zientek | 244/17.11 |
| 7,789,341 | B2 | * | 9/2010 | Arlton et al. | 244/17.23 |
| 2006/0011777 | A1 | * | 1/2006 | Arlton et al. | 244/7 B |
| 2007/0181742 | A1 | * | 8/2007 | Van de Rostyne et al. | 244/17.23 |

FOREIGN PATENT DOCUMENTS

DE      1205840 B      11/1965

OTHER PUBLICATIONS

International Preliminary Report on Patentability of the International Preliminary Examining Authority mailed by IPEA/US, U.S. Patent and Trademark Office on Oct. 24, 2011 for International Patent Application No. PCT/US09/44886, 7 pages.
Office Action from corresponding European application No. 09845031.5-1753 issued by the European Patent Office dated May 6, 2013.

(Continued)

*Primary Examiner* — Christopher P Ellis
*Assistant Examiner* — Medhat Badawi
(74) *Attorney, Agent, or Firm* — James E. Walton; Damon R. Hickman

(57) ABSTRACT

A rotor system for a rotorcraft includes a rotor hub having a plurality of rotor blade pairs mechanically coupled to a rotor mast. A pitch link assembly is mechanically coupled to each rotor blade pair for controlling the pitch angle of each rotor blade pair in tandem. Each rotor blade pair has an upper rotor blade and a lower rotor blade. The plurality of rotor blade pairs rotor in a single direction and about a single axis of rotation.

11 Claims, 5 Drawing Sheets

(56) References Cited

OTHER PUBLICATIONS

International Search Report and the Written Opinion of the International Searching Authority mailed by ISA/USA, U.S. Patent and Trademark Office on Jul. 14, 2009 for International Patent Application No. PCT/US09/44886, 7 pages.

International Written Opinion of the International Searching Authority mailed by ISA/USA, U.S. Patent and Trademark Office on Oct. 6, 2011 for International Patent Application No. PCT/US09/44886, 6 pages.

Office Action from corresponding Canadian application No. 2,762,219 issued by the Canadian Intellectual Property Office dated Oct. 7, 2013.

* cited by examiner

ROTOR HUB AND CONTROLS FOR MULTI-BLADED ROTOR SYSTEM

TECHNICAL FIELD

The present application relates in general to the field of rotor systems for rotorcraft.

DESCRIPTION OF THE PRIOR ART

There are many different types of rotorcraft, including helicopters, tandem rotor helicopters, tiltrotor aircraft, four-rotor tiltrotor aircraft, tilt wing aircraft, and tail sitter aircraft. In all of these rotorcraft, thrust and/or lift is generated by air flowing through a rotor disk formed by a plurality of rotating rotor blades. The plurality of rotor blades are mechanically coupled with and substantially evenly spaced about a rotatable mast, which provides rotational motion to the plurality of rotor blades. Each of the plurality of rotor blades is independently rotatable to affect a pitch of the blade. Varying the pitch of the plurality of blades affects lift and the direction of thrust produced by the rotating plurality of blades.

FIG. 1 depicts a military tiltrotor aircraft 101 with conventional rotor hubs 107a and 107b. Rotor hubs 107a and 107b are mechanically coupled to nacelles 103a and 103b, respectively. Nacelles 103a and 103b are rotably attached to wing members 105a and 105b, respectively. Wing members 105a and 105b are rigidly fixed to a fuselage 109. Rotor hubs 107a and 107b have a plurality of rotor blades 111a and 111b, respectively. The tiltrotor aircraft 101 of FIG. 1 is depicted in helicopter mode, with nacelles 103a and 103b directed up.

FIG. 2 depicts a commercial tiltrotor aircraft 201 with conventional rotor hubs 207a and 207b. Rotor hubs 207a and 207b are mechanically coupled to nacelles 203a and 203b, respectively. Nacelles 203a and 203b are rotably attached to wing members 205a and 205b, respectively. Wing members 205a and 205b are rigidly fixed to fuselage 209. Rotor hubs 207a and 207b have a plurality of rotor blades 211a and 211b, respectively. FIG. 2 depicts tiltrotor aircraft 201 in airplane mode, with nacelles 203a and 203b directed forward.

It is often desirable to utilize a greater number of rotor blades, rather than a fewer number, to increase the lift and/or thrust of a rotorcraft. As the number of rotor blades increases, however, the complexity of conventional rotorcraft rotor systems increases dramatically, in part because each of the rotor blades must be independently controlled, thereby increasing the size of the rotor hub. This increased complexity results in dramatic increases in weight and cost of such rotor systems.

There are many rotorcraft rotor systems well known in the art; however, considerable room for improvement remains.

BRIEF DESCRIPTION OF THE DRAWINGS

The novel features believed characteristic of the system of the present application are set forth in the appended claims. However, the system itself, as well as, a preferred mode of use, and further objectives and advantages thereof, will best be understood by reference to the following detailed description when read in conjunction with the accompanying drawings, wherein:

Figure 1:
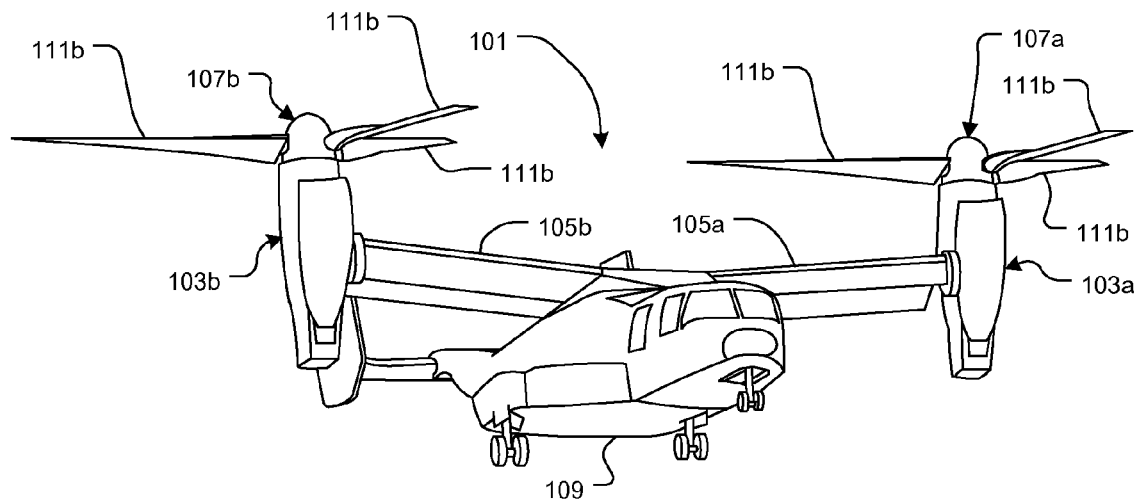
FIG. 1 is a perspective view of a prior art tiltrotor aircraft in helicopter mode.
Figure 2:
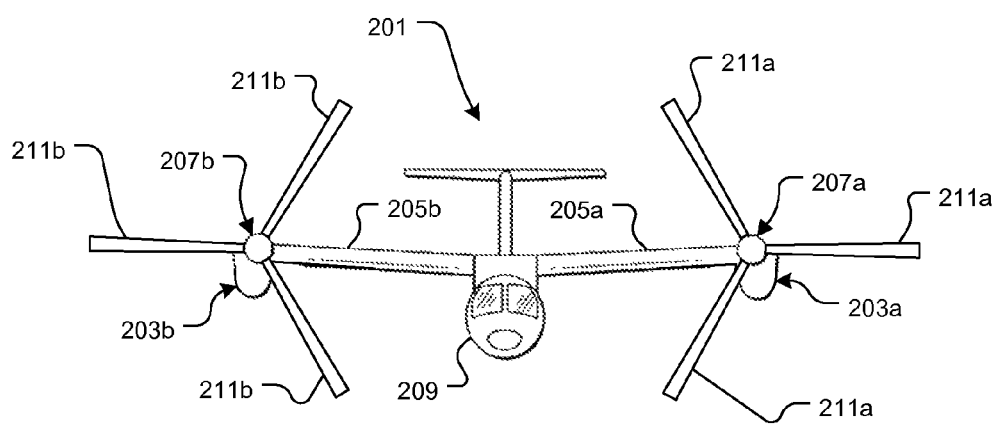
FIG. 2 is a front view of a prior art tiltrotor aircraft in airplane mode.

While the system of the present application is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the system of the present application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system of the present application represents a rotor system for a rotorcraft and a rotorcraft incorporating the rotor system. The rotor system includes a rotor hub having a plurality of rotor blade pairs. A pitch link assembly is mechanically coupled to each rotor blade pair, for controlling a pitch angle of the rotor blade pair in tandem. When one of the pitch control links is actuated, pitch orientation of the corresponding rotor blade pair is controlled.

Figure 3:
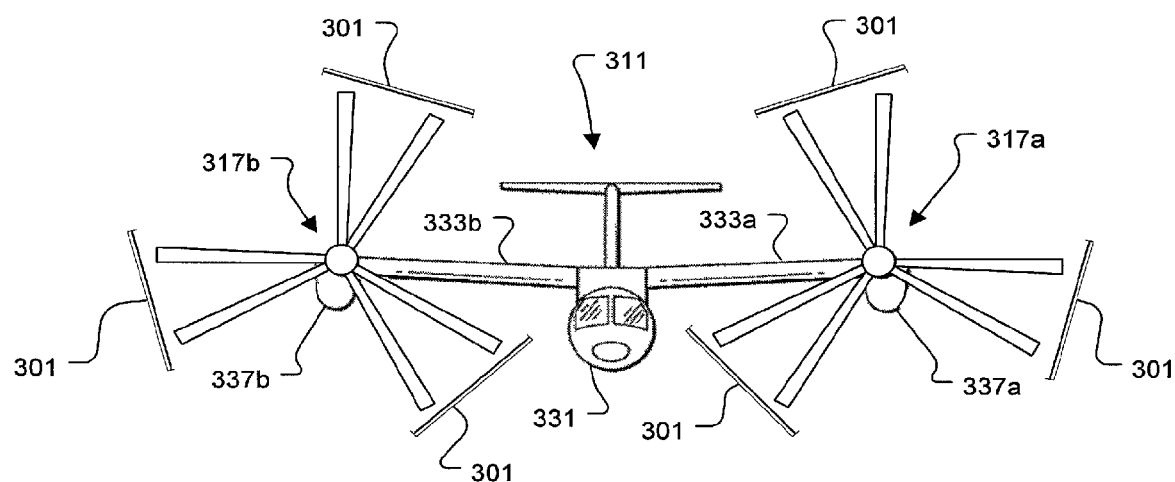
FIG. 3 is a front view of a tiltrotor aircraft, in airplane mode, having a rotor hub according the preferred embodiment of the present application.

Referring now to FIG. 3 in the drawings, FIG. 3 is a front view of a rotorcraft 311, while in airplane mode. A first rotor hub 317a is mechanically coupled to a first nacelle 337a and a second rotor hub 317b is couple to a second nacelle 337b. Nacelles 337a and 337b are pivotally attached to wing members 333a and 333b, respectively. Wing members 333a and 333b are rigidly attached to a fuselage 331. Nacelles 337a and 337b are configured to pivotally rotate relative to wing members 333a and 333b between a helicopter mode, in which nacelles 337a and 337b are tilted upward such that rotorcraft 311 flies similar to a conventional helicopter; and an airplane mode in which nacelles 337a and 337b are tilted forward such that rotorcraft 311 flies similar to a conventional propeller-driven airplane.

Figure 4:
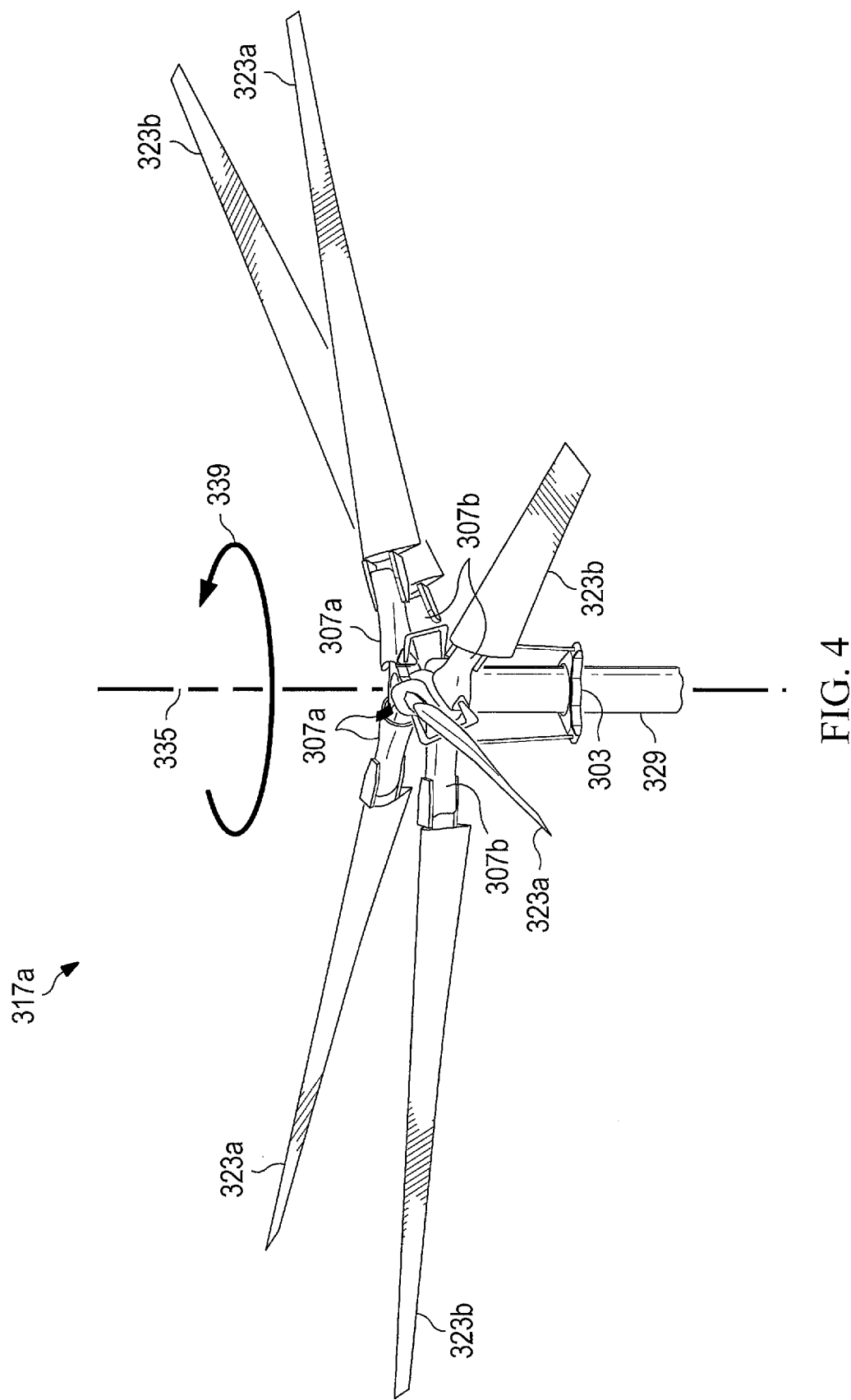
FIG. 4 is a perspective view of a rotor hub from the aircraft in FIG. 3, according to the preferred embodiment of the present application.

FIG. 4 in the drawings is a perspective view of rotor hub 317a from rotorcraft 311, while in helicopter mode. Rotor hub 317a comprises a plurality of rotor blade pairs 301. Each rotor blade pair 301 is controlled by a pitch link assembly 313. Pitch link assembly 313 is coupled to a swashplate 303. An upper rotor yoke 309 and a lower rotor yoke 319 are coupled to and rotatable by a mast 229 about an axis of rotation 335. A first blade pitch control member 307a is used, in part, to couple upper rotor yoke 309 to an upper rotor blade 323a. Similarly, a second blade pitch control member 307b is used, in part, to couple lower rotor yoke 319 to a lower rotor blade 323b.

Figure 5:
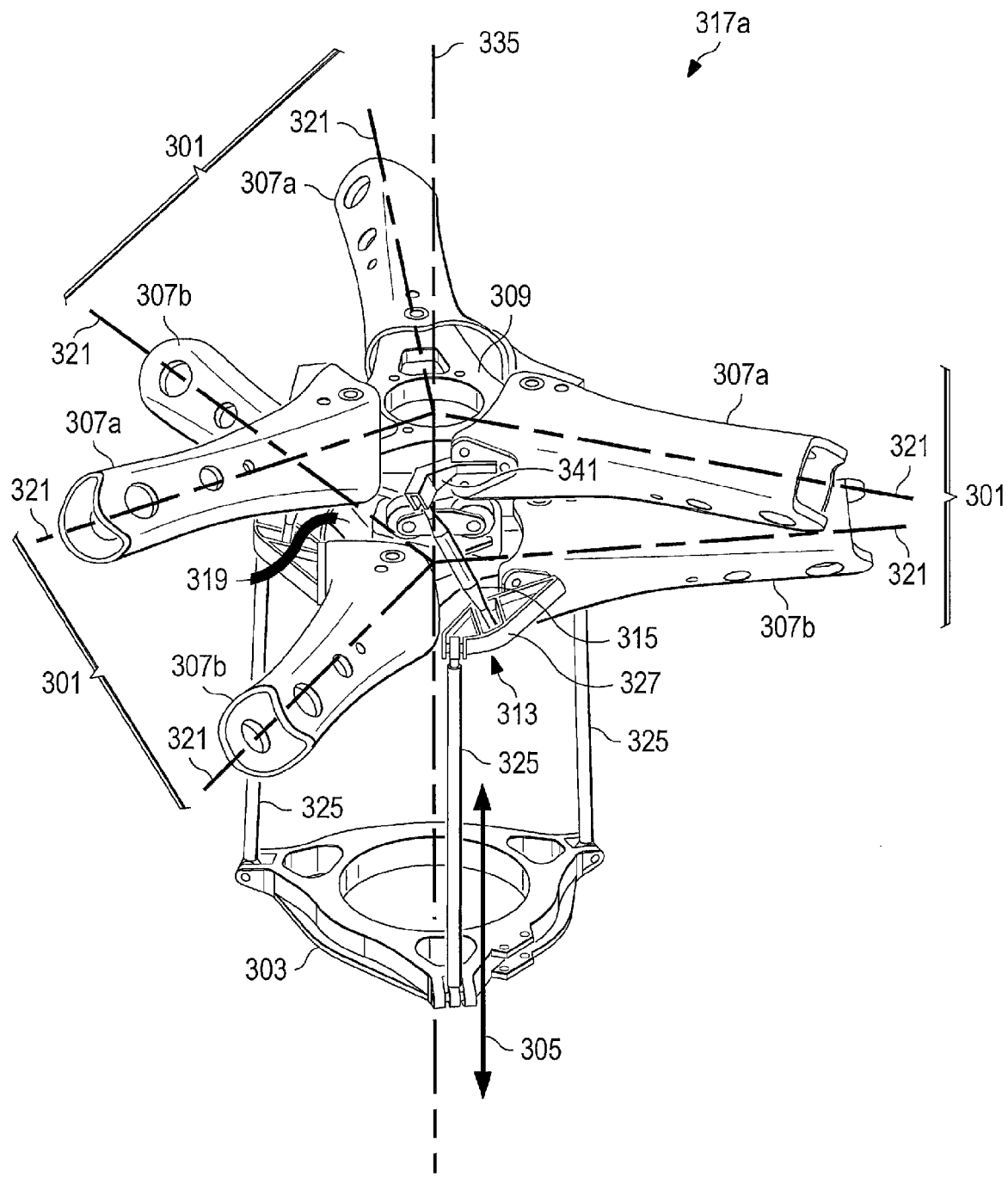
FIG. 5 is a close-up perspective view of a rotor hub from the aircraft in FIG. 3, according to the preferred embodiment of the present application.
Figure 6:
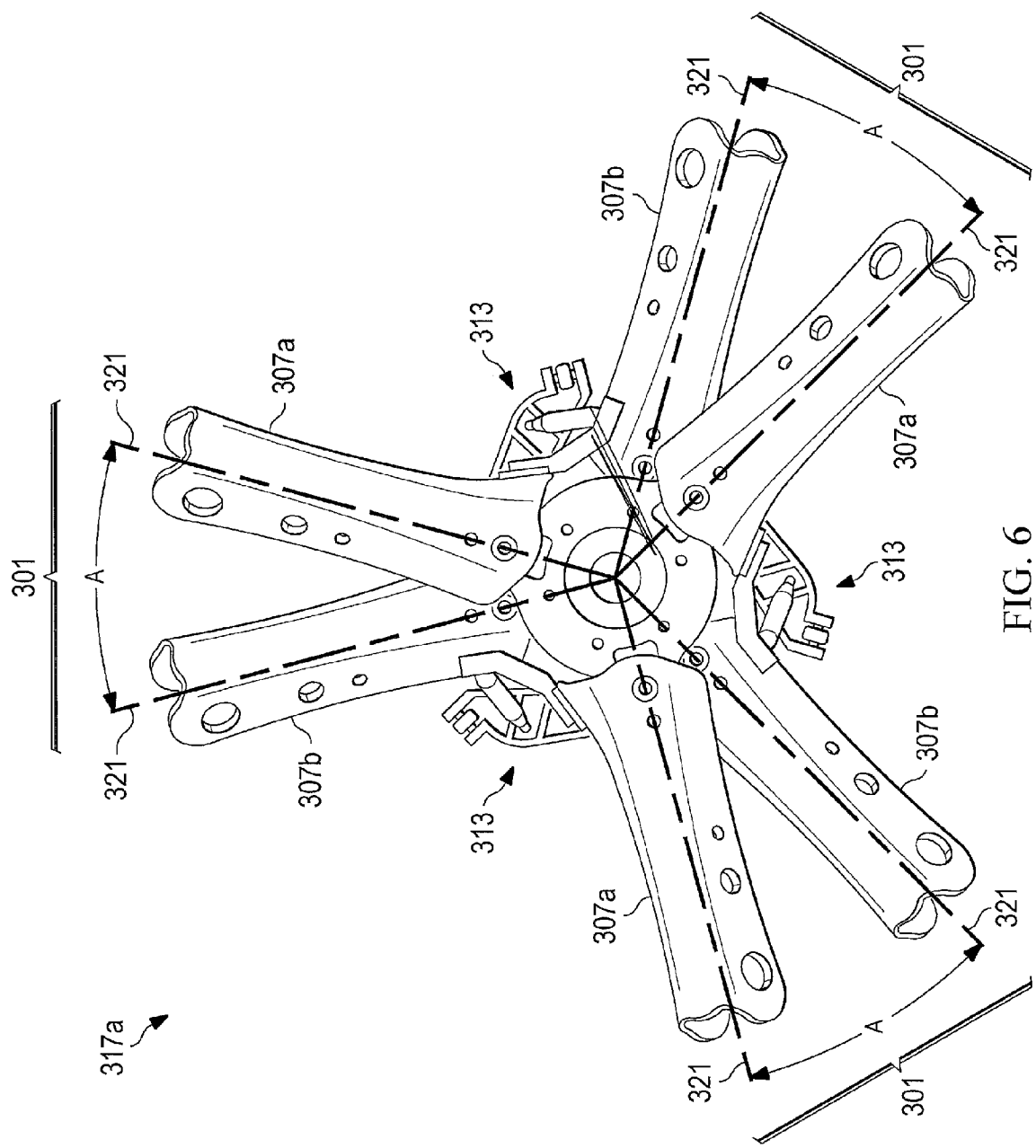
FIG. 6 is a top view of a rotor hub from the aircraft in FIG. 3, according to the preferred embodiment of the present application.

FIG. 5 is a close-up perspective view of a rotor hub from the aircraft in FIG. 3, according to the preferred embodiment of the present application. FIG. 6 is a top view of a rotor hub from the aircraft in FIG. 3, according to the preferred embodiment of the present application. Each rotor blade pair 301, shown best in FIGS. 3, 5 and 6, comprises upper rotor blade 323a and lower rotor blade 323b. Each rotor blade 323a and 323b has an airfoil shape capable of producing lift when air is moved over the airfoil shape. As such, the lift, direction, and thrust of rotorcraft 311 can be controlled by adjusting the pitch of upper rotor blade 323a and lower rotor blade 323b, in tandem. Upper rotor yoke 309 and lower rotor yoke 319 are located in two different planes separated along axis of rotation 335. As such, upper rotor blade 323a and lower rotor blade 323b operate primarily in the separate spatial planes as defined by the location of upper rotor yoke 309 and lower rotor yoke 319, respectively. Upper rotor yoke 309 and lower rotor yoke 319 are clocked by a selected angle A, about axis of rotation 335, as such; upper rotor blade 323a and lower rotor blade 323b are positioned about the same selected angle A. In the preferred embodiment, selected angle A is approximately 30 degrees; however, selected angle A may also be other angles depending at least upon factors, such as, number of rotor blade pairs 301 and size of rotor blades 323a and 323b, and desired performance requirements. For clarity, FIGS. 5 and 6 do not illustrate upper rotor blade 323a and lower rotor blade 323b; however, it should be appreciated that rotor blades 323a and 323b are coupled to blade pitch control members 307a and 307b, respectively, as best shown in FIG. 4.

Pitch link assembly 313 provides a mechanical control to each rotor blade pair 301. Pitch link assembly 313 comprises a swashplate link 325 mechanically coupling swashplate 303 to a lower pitch horn 327. An intermediate link 315 mechanically connects an upper pitch horn 341 to lower pitch horn 327. First blade pitch control member 307a is coupled to upper pitch horn 341. Similarly, second blade pitch control member 307b is coupled to lower pitch horn 327. Actuation of pitch link assembly 313 operates to control to the pitch of rotor blades 323a and 323b of rotor blade pair 301. Specifically, controlled input into swashplate 303 actuates swashplate link 325 in directions generally corresponding to a double-headed arrow 305, shown in FIG. 5. When swashplate link 325 is so actuated, intermediate link 315 functions to adjust the pitch of both rotor blades 323a and 323b of rotor blade pair 301; each about a respective rotor blade pitch axis 321. FIG. 5 illustrates in detail a single pitch link assembly 313; however it should be appreciated that each rotor blade pair 301 is controlled with pitch link assembly 313.

FIG. 3 further depicts the preferred embodiment having of three rotor blade pairs 301 on each rotor hub 317a and 317b. Pitch setting for each of rotor blade pair 301 is controlled independently. As discussed herein, pitch setting of rotor blades 323a and 323b are controlled in tandem for each rotor blade pair 301. Axis of rotation 335 is the internal axis of rotor mast 329, as shown best in FIGS. 4 and 5. Rotor hub 317a is rotatable about axis of rotation 335 in a counterclockwise direction 339. Rotor hub 317b is a symmetrical version of rotor hub 317a, thereby being configured to rotate in the opposite direction of rotor hub 317a. As analyzed on rotorcraft 311, rotor hubs 317a and 317b provide a net torque of zero, thereby preventing the need of a torque canceling device, such as a tailrotor. While the preferred embodiment depicts three rotor blade pair 301 on each rotor hub 317a and 317b, the scope of the system of the present application is not so limited. Rather, any suitable plurality of rotor blade pair 301 may be used, and the system of the present application contemplates such alternative embodiments.

The preferred embodiment of a rotorcraft 311, shown best in FIG. 3, incorporates two rotor hubs 317a and 317b, and a plurality of rotor blade pairs 301, operably associated with each rotor hub 317a and 317b. Masts 329 (one shown in FIG. 4) extend from a transmission (not shown) within each nacelle 337a and 337b of rotorcraft 311. It should be noted that, while rotorcraft 311 is depicted in FIG. 3 as being a tiltrotor aircraft having two rotor hubs 317a and 317b, the scope of the system of the present application is not so limited. Rather, the system of the present application contemplates rotorcraft 311 being any type of rotorcraft, such as a helicopter, a tandem rotor helicopter, a tiltrotor aircraft, a four-rotor tiltrotor aircraft, a tilt wing aircraft, or a tail sitter aircraft, and having any plurality of rotor hubs 317a and 317b.

The system of the present application provides significant advantages, including: (1) providing a way to utilize a plurality of rotor blades in a rotorcraft without the added complexity found in conventional rotorcraft; (2) providing a way to utilize a plurality rotor blades in a rotorcraft without the added control mechanism weight found in conventional rotorcraft; (3) providing a way to utilize a plurality rotor blades in a rotorcraft while keeping the rotor hub size as small as possible; and (4) providing a rotor system that utilizes a pitch control assembly that is able to control multiple rotor blades.

It is apparent that a rotor system with significant advantages has been described and illustrated. Although the system of the present application is shown in a limited number of forms, it is not limited to just these forms, but is amenable to various changes and modifications without departing from the spirit thereof.

The invention claimed is:

1. A rotor system for a rotorcraft, comprising:
a rotor hub having a plurality of rotor blade pairs, each rotor blade pair comprises:
an upper rotor blade coupled to an upper rotor yoke; and
a lower rotor blade coupled to a lower rotor yoke;
the upper rotor yoke and the lower rotor yoke coupled to a rotor mast;
a pitch link assembly coupled to each rotor blade pair for controlling a first pitch angle of the upper rotor blade and a second pitch angle associated with the lower rotor blade, the pitch link assembly comprising:
a swashplate link directly coupled between the swashplate and a lower pitch horn, the lower pitch horn being substantially located in a lower plane, the lower plane being defined by the lower rotor yoke;
an intermediate link coupled between the lower pitch horn and an upper pitch horn; and a rotor swashplate coupled to the pitch link assembly;
wherein the plurality of rotor blade pairs rotate in a single direction about a single axis of rotation;
wherein the upper rotor blade of each rotor blade pair is clocked from the lower rotor blade of each rotor blade pair by a selected angle about the single axis of rotation.

2. The rotor system according to claim 1, wherein the upper pitch horn is located in an upper plane, the upper plane being defined by the upper rotor yoke.

3. The rotor system according to claim 1, wherein the selected angle is approximately 30 degrees.

4. The rotor system according to claim 1, wherein the pitch link assembly is configured such that actuation of the pitch link assembly controls, adjusts in tandem, the first pitch angle and the second pitch angle.

5. The rotor system according to claim 1, wherein operation of the swashplate actuates at least one of the pitch link assemblies.

6. The rotor system according to claim 1, wherein each rotor blade pair further comprises:
   a first blade pitch control member coupled between the upper rotor blade and the upper rotor yoke; and
   a second blade pitch control member coupled between the lower rotor blade and the lower rotor yoke.

7. A rotorcraft, comprising:
   a fuselage;
   a wing member;
   a rotor hub having a plurality of rotor blade pairs, each rotor blade pair comprises:
      an upper rotor blade coupled to an upper rotor yoke; and
      a lower rotor blade coupled to a lower rotor yoke;
   the upper rotor yoke and the lower rotor yoke coupled to a rotor mast;
   a pitch link assembly coupled to each rotor blade pair for controlling a first pitch angle of the upper rotor blade and a second pitch angle associated with the lower rotor blade, the pitch link assembly comprising:
      a swashplate link coupled directly between the swashplate and a lower pitch horn, the lower pitch horn being substantially located in a lower plane, the lower plane being defined by the lower rotor yoke;
      an intermediate link coupled directly between the lower pitch horn and an upper pitch horn; and
   a rotor swashplate coupled to the pitch link assembly;
   wherein the plurality of rotor blade pairs rotate in a single direction about a single axis of rotation;
   wherein the upper rotor blade of each rotor blade pair is clocked from the lower rotor blade of each rotor blade pair by a selected angle about the single axis of rotation.

8. The rotorcraft according to claim 7, wherein the upper pitch horn is located in an upper plane, the upper plane being defined by the upper rotor yoke.

9. The rotorcraft according to claim 8, wherein the selected angle is approximately 30 degrees.

10. The rotorcraft according to claim 7, wherein the pitch link assembly is configured such that actuation of the pitch link assembly controls, in tandem, the first pitch angle and the second pitch angle.

11. The rotorcraft according to claim 7, wherein operation of the swashplate actuates at least one of the pitch link assemblies.

* * * * *